Patented Dec. 15, 1925.

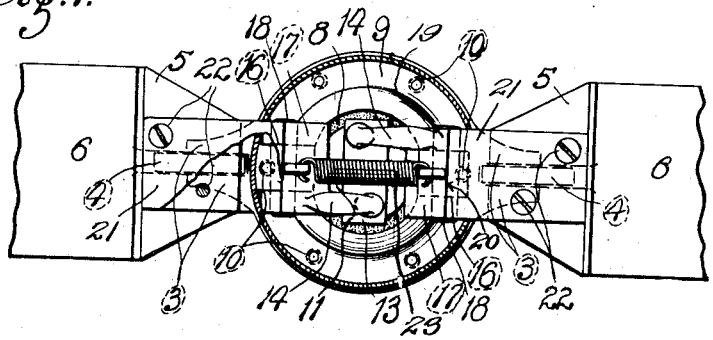

1,565,841

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

AIR BRAKE FOR AUTOMOBILES.

Application filed May 3, 1924. Serial No. 710,763.

*To all whom it may concern:*

Be it known that I, HERBERT W. ALDEN, a citizen of the United States, and a resident of the city of Detroit, in the county of Wayne and State of Michigan, have invented a new and useful Improvement in Air Brakes for Automobiles, of which the following is a specification.

My invention relates to air brakes, particularly those intended for use on the front or rear wheels of automobiles, and it has for its principal objects to produce a brake that is simple, compact and easily operated and is not likely to get out of repair; to provide means for equalizing the pressures on the brake shoes; and to produce a brake that may be applied as a unit to the steering knuckle or brake spider.

The invention consists in the brake and in the parts and combination of parts hereinafter described and claimed.

In the accompanying drawing which forms part of this specification and wherein like numerals refer to like parts wherever they occur, Fig. 1 is a top plan view of a brake construction conforming to my invention separated from the brake drum with which it cooperates, the casing being shown in section and a portion of one end plate being broken away;

Fig. 2 is an elevation, certain parts being shown in central vertical section; and Fig. 3 is a perspective view of one of the bell crank levers or rock shafts that actuate the brake shoes.

My device comprises a member 2, which is adapted to be mounted on or attached to the steering knuckle (indicated at 1) of the front axle or on a suitable brake spider and constitutes a base or support for the brake operating mechanism. The member 2 which is preferably a casting, is provided with projecting lugs or ears 3 on each side thereof between each pair of which fits a projecting lug 4 on the end of a brake member of any desired construction such as a brake shoe 5. Each brake shoe has a suitable brake lining 6, and the two brake shoes are hinged together as indicated at 6ª.

The mounting member or base 2 is provided with a central depression 7 over which is a diaphragm 8 of rubberized fabric or other suitable material. Above said diaphragm is a ring 9 which is secured to the mounting member or base 2 by means of suitable screws 10, whereby said diaphragm is clamped air-tight against said mounting member. Thus, an air-tight chamber is formed between the member 2 and the diaphragm 8. Compressed air from a suitable source under the control of the operator is admitted to and released from this chamber through a suitably located port indicated at 7ª.

Resting on the diaphragm 8 is a pressure plate 11 that is provided with a central rounded boss 12 on its upper surface that fits in a spherical socket or recess in the underside of the middle portion of a bar 13 that rests thereon. The upper surface of said bar has a rounded depression near each end, and in each depression rests the rounded or ball-shaped end of one of two bell crank levers or rock shafts 14 whose other ends are adapted to actuate the respective brake shoes. Said rock shafts are journaled in bearings provided therefor in said clamping ring 9. By this arrangement, said bar can rock on said boss and thereby equalize the action of the bell crank levers or rock shafts 14, the compensating action being automatic.

Bosses 16 projecting from the ring 9 are straddled by projecting portions 17 of the above mentioned bell crank levers or rock shafts 14, and the bosses and levers are pivotally secured together by rods or pintles 18 passing therethrough. Said bell crank levers 14, as above stated, are disposed at opposite ends of the compensating bar 13.

The shorter arm 19 of each bell crank lever is widened out into a portion 20 that contacts with the end of a plate or end fitting 21 secured to the end of each brake shoe 5, as by bolts 22. As suitable spring shoe 5, as by bolts 22. As suitable spring 23 connects the shorter arms of the bell crank levers and tends to pull them together and away from the fittings on the ends of the brake shoes.

The construction hereinbefore described is a mechanical unit that can be assembled and attached or applied as such to the vehicle. When it is to be applied to a steering knuckle, its mounting member or base 2 is secured to the knuckle by any means suitable for the purpose, as by screws. A suitable brake drum is secured to the wheel concentric with the axis thereof and in proper position for cooperation with the brake shoes; and suitably attached springs 25 are provided for stripping the brake shoes from the brake drum. If desired, any additional fittings suitable for the purpose may be used for preventing displacement of the brake shoes; but such additional devices are not needed and, as such devices are well-known, they have been omitted from the drawing together with the wheel construction, and the axle construction is only represented diagrammatically.

The operation of the brake is as follows: When air under pressure is admitted into the air chamber it distends the diaphragm and raises the pressure plate 11 thereon, the compensating bar 13 on said pressure plate and the long arms of the bell crank levers 14 that are in contact with the respective ends of said compensating bar. The consequent rocking of such levers causes the cam portions of their short arms to bear or press against the ends of the contact plates 21 of the respective brake shoes 5 and swing said brake shoes on their pivot and against the brake drum, the brake shoes being guided by the lugs provided therefor on the base or mounting member 2. When the air pressure is released, the spring 23 connecting the bell crank levers pushes down the compensating bar, pressure plate and diaphragm; and the other springs 25 trip the brake shoes from the brake drum. In this operation, the compensating bar automatically accommodates any relative movement between the pressure plate and the bell crank levers and equalizes the power applied to said brake shoes.

Obviously, changes may be made without departing from the invention and I do not wish to be limited to the precise construction shown.

What I claim is:

1. An air brake for automobiles comprising brake members, bell crank levers operatively connected to said brake members respectively, actuating means, and a compensating bar intermediate said levers and actuating means, said compensating bar being operatively connected at its middle portion to said actuating means and at its end portions to said levers.

2. An air brake for automobiles comprising brake members, an air chamber, a diaphragm therefor, a pressure plate on said diaphragm, a bar having rocking engagement with said plate to be actuated thereby, and bell crank levers operatively connected to the respective ends of said bar and to said brake members.

3. An air brake for automobiles comprising friction members, a body member having an air chamber, a diaphragm for said air chamber, a ring for securing said diaphragm to said body member, a plate on said diaphragm, having a boss thereon, a bar on said boss, bell crank levers engaging said bar on opposite sides of said boss and arranged to operate the friction members.

4. An air brake for automobiles comprising a body member attachable to a steering knuckle or the like and having an air chamber, a diaphragm covering said air chamber, a ring for securing said diaphragm to said body member, a plate on said diaphragm, said plate having a boss thereon, a bar on said plate having a depression to cooperate with the boss of said plate, bell crank levers each having an end resting on said bar, and the other end of each bell crank lever being adapted and arranged to operate the brake shoes, said ring having upstanding bosses diametrically opposite each other, and each of said bell crank levers having projecting portions straddling a boss and pivotally secured thereto.

5. In an automobile brake mechanism, brake shoes pivotally connected together, contact plates secured to the free ends of said brake shoes, bell crank levers each engaging one of said contact plates to operate a brake shoe, and means for actuating said levers, said means comprising a device for equalizing the actuating force between said brake shoes, said device having its middle portion tiltably fulcrumed against the actuating means and bearing at points equidistant from the fulcrum against the respective levers.

6. In an automobile brake mechanism, brake shoes, contact plates secured to the end of each brake shoe, bell crank levers with their fixed fulcrum points near the middle thereof and each engaging one of said contact plates to operate a brake shoe, and a spring secured to said bell crank levers and tending to pull them away from said contact plates.

7. An automobile brake construction comprising brake shoes hinged together, brake operating mechanism and a support for said operating mechanism attachable to a steering knuckle, said support having guide lugs projecting transversely therefrom and said brake shoes being provided with cooperating guide lugs and springs for keeping said brake shoes in position, whereby said construction can be attached and detached as a unit.

Signed at Detroit, this 10th day of April, 1924.

HERBERT W. ALDEN.